United States Patent
Keshavaraj

(10) Patent No.: US 6,299,965 B1
(45) Date of Patent: Oct. 9, 2001

(54) INFLATABLE FABRICS COMPRISING PEEL SEAMS WHICH BECOME SHEAR SEAMS UPON INFLATION

(75) Inventor: Ramesh Keshavaraj, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/442,253

(22) Filed: Nov. 17, 1999

(51) Int. Cl.[7] ................. B32B 3/04; B32B 5/18; B60R 21/16
(52) U.S. Cl. ............ 428/125; 428/34; 428/35.2; 428/35.5; 428/36.1; 428/43; 428/57; 428/59; 428/66.3; 428/69; 428/76; 428/102; 428/119; 428/121; 428/123; 428/124; 428/129; 442/76; 442/181; 442/239; 280/728.1; 280/729; 280/743.1; 139/384; 139/389
(58) Field of Search ................. 428/34, 36.1, 43, 428/57, 59, 66.3, 69, 76, 102, 121, 119, 123, 124, 125, 129, 35.2, 35.5, 193; 442/76, 181, 239; 280/728.1, 729, 743.1; 139/384, 383, 389

(56) References Cited

U.S. PATENT DOCUMENTS 3,575,776 * 4/1971 MacIntyre ................. 161/49
6,086,095 * 7/2000 Keshavaraj ................. 280/743.1
6,220,629 * 4/2001 Wipasuramonton et al. ..... 280/743.1

FOREIGN PATENT DOCUMENTS

WO 98/12075 * 3/1998 (WO) ............. B60R/21/16
WO 01/23219 * 4/2001 (WO) ............. B60R/21/16

* cited by examiner

*Primary Examiner*—Terrel Morris
*Assistant Examiner*—Arti R. Singh
(74) *Attorney, Agent, or Firm*—Terry T. Moyer; William S. Parks

(57) ABSTRACT

The invention relates to inflatable fabrics which comprise two separated and distinct fabric layers in discrete areas of such fabrics as well as C-shaped seam-producing materials to which such fabric layers are attached. The resultant inflatable fabric composite this includes inflatable areas separated, at least partially, by seamed barrier areas. This configuration will form "pillowed" structures within the target fabric upon inflation. Such seam-producing materials are incorporated within the two-layer structure as C-shaped peel seams in relation with the individual fabric layers. Upon inflation, the seams then act as shear seams which greatly increases the overall strength of the two-layer inflatable fabric. These shear seams thus provide a relatively effective manner of reducing air permeability within the entire fabric article. Such a fabric may be utilized in numerous and various applications wherein fabric inflation is desired or necessary. In particular, the inventive fabric may be incorporated within an airbag cushion.

6 Claims, 3 Drawing Sheets

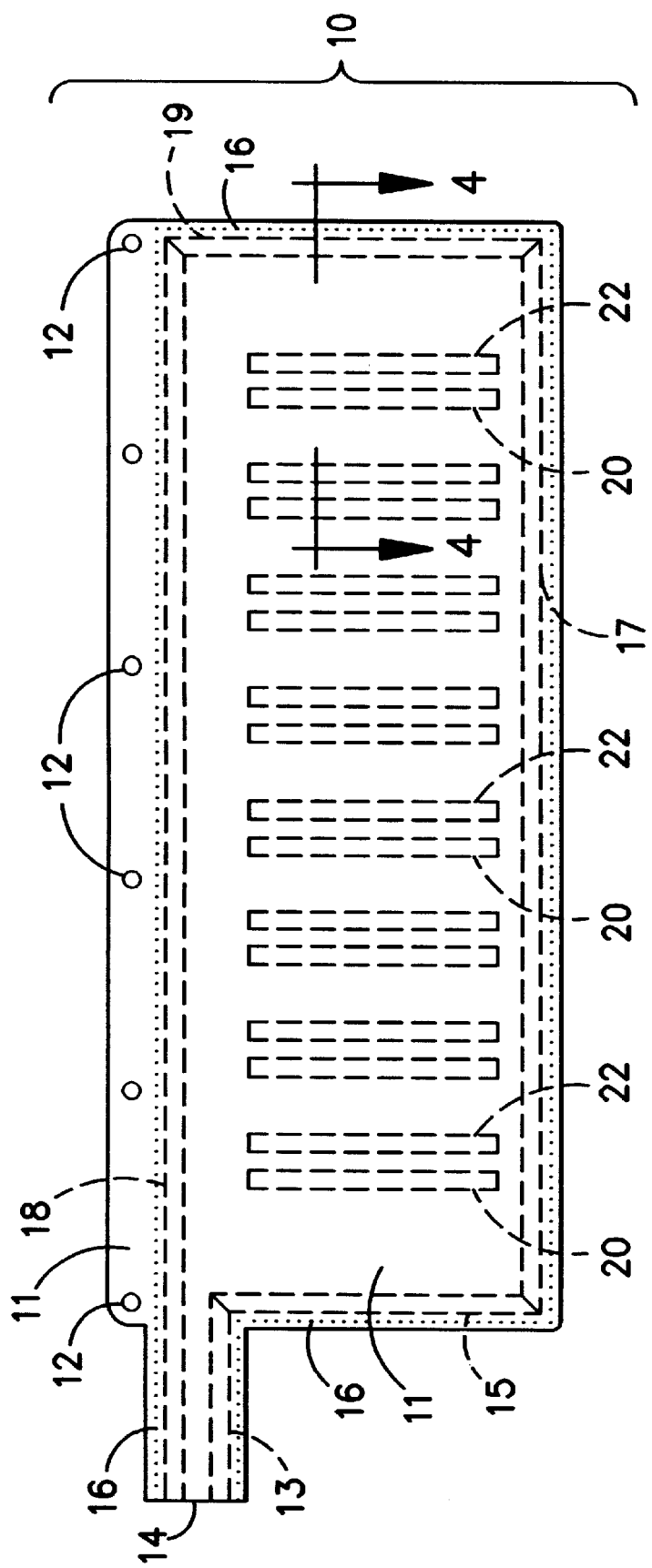
FIG. -1-

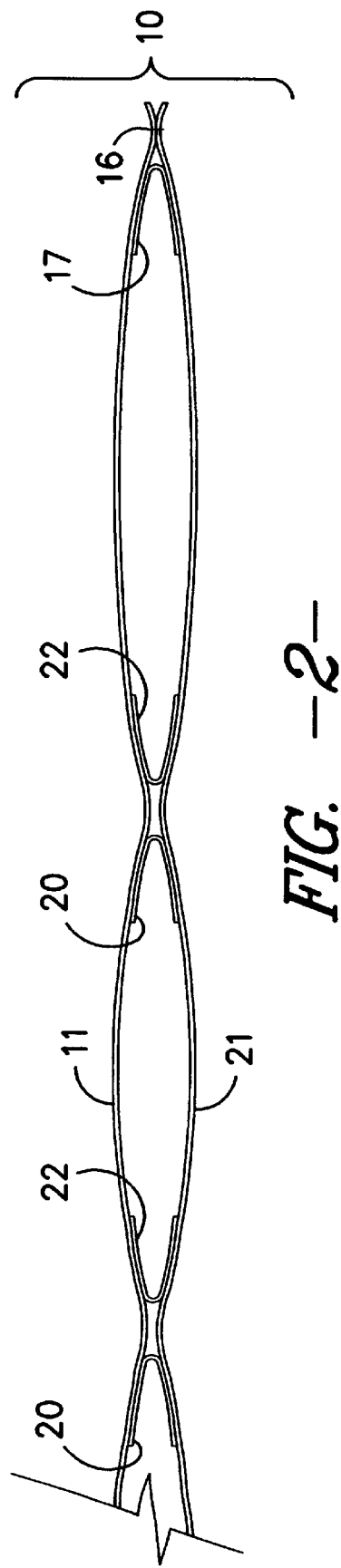
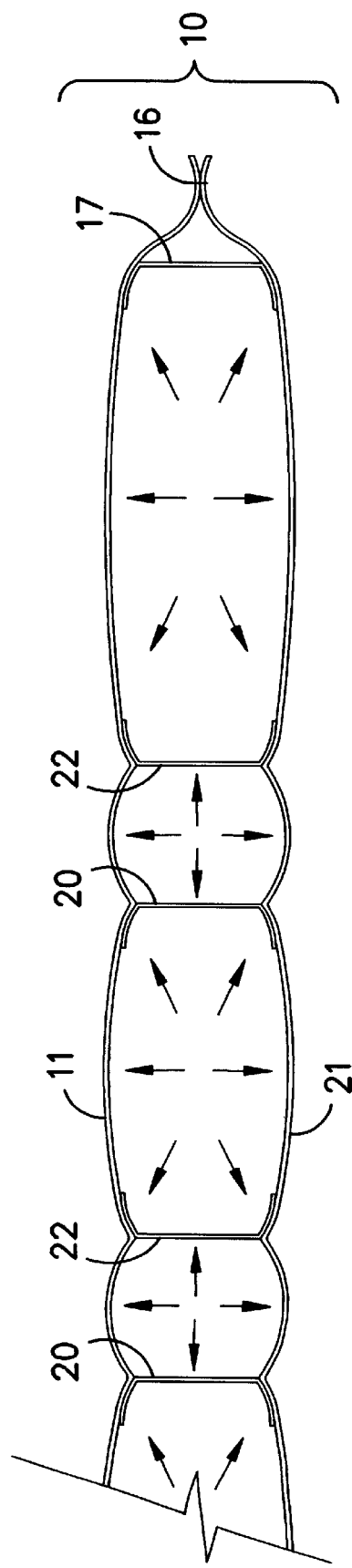

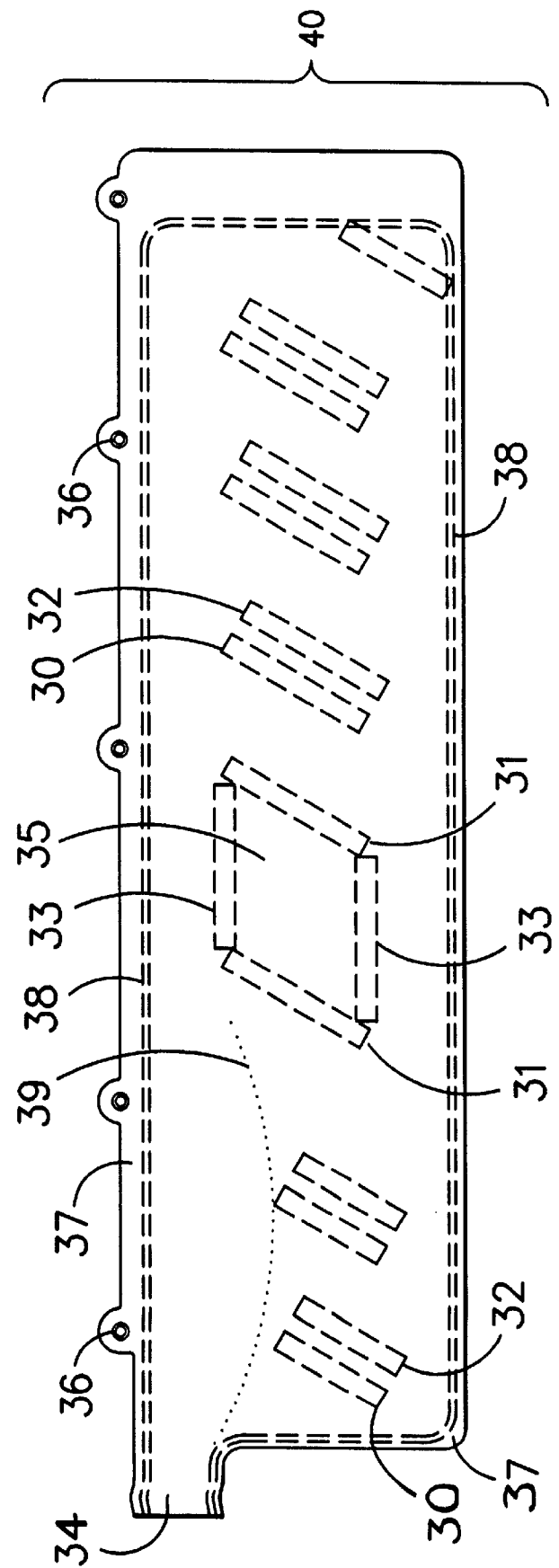
FIG. -4-

INFLATABLE FABRICS COMPRISING PEEL SEAMS WHICH BECOME SHEAR SEAMS UPON INFLATION

FIELD OF THE INVENTION

The invention relates to inflatable fabrics which comprise two separated and distinct fabric layers in discrete areas of such fabrics as well as C-shaped seam-producing materials to which such fabric layers are attached. The resultant inflatable fabric composite this includes inflatable areas separated, at least partially, by seamed barrier areas. This configuration will form "pillowed" structures within the target fabric upon inflation. Such seam-producing materials are incorporated within the two-layer structure as C-shaped peel seams in relation with the individual fabric layers. Upon inflation, the seams then act as shear seams which greatly increases the overall strength of the two-layer inflatable fabric. These shear seams thus provide a relatively effective manner of reducing air permeability within the entire fabric article. Such a fabric may be utilized in numerous and various applications wherein fabric inflation is desired or necessary. In particular, the inventive fabric may be incorporated within an airbag cushion.

BACKGROUND OF THE PRIOR ART

All U.S. patents cited herein are hereby fully incorporated by reference.

Inflatable protective cushions used in passenger vehicles are a component of relatively complex passive restraint systems. The main elements of these systems are: an impact sensing system, an ignition system, a propellant material, an attachment device, a system enclosure, and an inflatable protective cushion. Upon sensing an impact, the propellant is ignited causing an explosive release of gases filing the cushion to a deployed state which can absorb the impact of the forward movement of a body and dissipate its energy by means of rapid venting of the gas. The entire sequence of events occurs within about 30 milliseconds. In the undeployed state, the cushion is stored in or near the steering column, the dashboard, in a door, or in the back of a front seat placing the cushion in close proximity to the person or object it is to protect.

Inflatable cushion systems commonly referred to as air bag systems have been used in the past to protect both the operator of the vehicle and passengers. Systems for the protection of the vehicle operator have typically been mounted in the steering column of the vehicle and have utilized cushion constructions directly deployable towards the driver. These driver-side cushions are typically of a relatively simple configuration in that they function over a fairly small well-defined area between the driver and the steering column. One such configuration is disclosed in U.S. Pat. No. 5,533,755 to Nelsen et al., issued Jul. 9, 1996, the teachings of which are incorporated herein by reference.

Inflatable cushions for use in the protection of passengers against frontal or side impacts must generally have a more complex configuration since the position of a vehicle passenger may not be well defined and greater distance may exist between the passenger and the surface of the vehicle against which that passenger might be thrown in the event of a collision. Prior cushions for use in such environments are disclosed in U.S. Pat. No. 5,520,416 to Bishop; U.S. Pat. No. 5,454,594 to Krickl; U.S. Pat. No. 5,423,273 to Hawthorn et al.; U.S. Pat. No. 5,316,337 to Yamaji et al.; U.S. Pat. No. 5,310,216 to Wehner et al.; U.S. Pat. No. 5,090,729 to Watanabe; U.S. Pat. No. 5,087,071 to Wallner et al.; U.S. Pat. No. 4,944,529 to Backhaus; and U.S. Pat. No. 3,792,873 to Buchner et al.

The majority of commercially used restraint cushions are formed of woven fabric materials utilizing multifilament synthetic yarns of materials such as polyester, nylon 6 or nylon 6,6 polymers. Representative fabrics for such use are disclosed in U.S. Pat. No. 4,921,735 to Bloch; U.S. Pat. No. 5,093,163 to Krummheuer et al.; U.S. Pat. No. 5,110,666 to Menzel et al.; U.S. Pat. No. 5,236,775 to Swoboda et al.; U.S. Pat. No. 5,277,230 to Sollars, Jr.; U.S. Pat. No. 5,356,680 to Krummheuer et al.; U.S. Pat. No. 5,477,890 to Krummheuer et al.; U.S. Pat. No. 5,508,073 to Krummheuer et al.; U.S. Pat. No. 5,503,197 to Bower et al.; and U.S. Pat. No. 5,704,402 to Bowen et al. A two-weave construction airbag cushion is exemplified in U.S. Pat. No. 5,651,395 to Graham et al. but does not discuss the importance of narrow basket-weave single fabric layers.

As will be appreciated, the permeability of an airbag cushion structure is an important factor in determining the rate of inflation and subsequent rapid deflation following the impact event. Different airbag cushions are utilized for different purposes. For instance, some airbag cushions are installed within inflation modules for driver protection within the steering column of an automobile. Others are utilized as protection for front seat passengers and are installed in and around the glove compartment and/or on the dashboard in front of such a passenger seat. Still others have been developed in an effort to protect all passengers during a long-duration impact event, such as, for example, a rollover collision. In those types of crashes, the target airbag cushion must inflate quickly under high pressure (such as between about 10 and 40 psi) and remain inflated at a relatively high pressures in order to provide the greatest degree of protection to such passengers. Furthermore, such long-duration airbag cushions preferably comprise "pillow" formations created through the attachment of at least two different fabrics or fabric ends together and sealed, sewn, or the like, together. Upon inflation the free space between the attachment points inflate as well, thereby producing the desired cushioned "pillow" structures. Such long-duration, "pillowed" structures have been disclosed in the prior art as airbag cushions within U.S. Pat. No. 5,788,270 to Halano. However, in order to provide a suitable, effective airbag fabric and cushion comprising two or more points of attachment between fabrics or fabric ends, there has been a need to improve upon the structural integrity of the seams at such attachment points to prevent unwanted and potentially harmful leakage of gas or air from within the target airbag cushion. The prior art has discussed the development of coatings to place over the sewn seams at such attachment points in order to seal the potentially loose portions of such seams and/or to keep the individual yarns of the airbag fabrics at the attachment points stationary in order to prevent yarn shifting and thus possible openings for air or gas leakage. However, such coatings are actually supplemental to the seam structures in providing the necessary barrier to air or gas. A strong, effective, efficient weave construction is the primary method of initially producing an effective airbag fabric for incorporation within an airbag cushion.

These prior "pillowed" airbag cushions, however, have been produced solely through specific weaving patterns at the attachment points between the two fabric layers. The possibility of stitch movement during inflation is very high with such airbag cushions. As a result, very thick coatings, as noted above, are required to sustain very low air permeability over the fabric during and after an inflation event. Furthermore, individual sewn seams do not provide consistently low air permeability without utilization of large amounts of relatively expensive coating compositions for the same reasons. The strength and integrity of such seams, particularly present at the surfaces of both fabric layers, are not present without some type of coating to prevent the escape of air during high pressurization of the fabric. Such overall, highly coated, inflatable fabric structures may possess the necessary air permeability characteristics required for proper functioning within a side curtain airbag cushion; however, the costs are extremely high with the amounts of required coatings and the barrier to air leakage provided by such coatings is still suspect (yarn shifting will most likely occur during an inflation event which may produce discontinuities in the integrity of the coating which may in turn compromise the long-term air permeability required for certain airbag applications). Alternatives which permit the utilization of an inflatable two-layer fabric alone (or with substantially reduced amounts of necessary coating materials) that provide very strong seams to form "pillowed" structures within such fabrics upon inflation and that do not comprise excessive attachment points between two fabric layers (which would permit dislocation of substantial numbers of stitches that would invariably increase the air permeability rate of the target fabric) would be highly desired in comparison with the costly products now commercially available. To date, the prior art has not accorded the airbag market with such an advancement in this area.

SUMMARY OF THE INVENTION

In view of the foregoing, it is a general object of the present invention to provide an inflatable fabric comprising at least one peel seam which becomes a shear seam upon inflation. It is a more particular object of the present invention to provide an inflatable fabric with at least two layers of fabric which forms pillowed structures upon inflation without the utilization of or need for sewn seams or specific woven structures. Also, an object of this invention is for the utilization of such inflatable fabrics as airbag cushions within a vehicle restraint system. The term "vehicle restraint system" is intended to mean both inflatable occupant restraining cushion and the mechanical and chemical components (such as the inflation means, ignition means, propellant, and the like).

To achieve these and other objects and in accordance with the purpose of the invention, as embodied and broadly described herein, the invention provides an inflatable fabric comprising at least two layers of fabric in certain discrete areas of the fabric and at least one C-shaped material, having a first and second end and a front and back side, interposed between said two layers of fabric and simultaneously attached to said two layers of fabric wherein said first end is attached to one layer and said second end is attached to the other layer. Preferably, such inflatable fabrics and C-shaped materials are all woven in structure.

The term "inflatable fabric" is intended to encompass any fabric that is constructed of at least two layers of fabric which can be sealed to form a bag article. The inventive inflatable fabric thus must include double layers of fabric to permit such inflation, as well as single layers of fabric either to act as a seal at the ends of such fabric panels, or to provide "pillowed" chambers within the target fabric upon inflation. The term "all-woven" as it pertains to the inventive fabric thus requires that the inflatable fabric having double and single layers of fabric be produced solely upon a loom. Any type of loom may be utilized for this purpose, such as water-jet, air-jet, rapier, dobby, and the like. Jacquard weaving and dobby weaving, however, are most preferred.

The utilization of such C-shaped materials configured in such specific relation to and simultaneously attached to the two layers of fabrics provides a number of heretofore unexplored benefits within inflatable fabric structures. For example, such a C-shaped material provides a peel seam with each individual layer of fabric upon contact and attachment. However, upon inflation, the peel seams are actually translated to shear seams. Peel seams are well known in the fabric art as attachments between separate layers or portions of fabrics which are pulled apart through a peeling motion between the two layers (i.e., peeled apart in two opposite directions both perpendicular to the two layers). Shear seams, on the other hand, require shear force to detach one layer from the other (i.e., sheared apart in two opposite directions parallel to the Iwo layers). Shear seams are greater in strength than peel seams since the force required to detach, separate, or otherwise destroy the seam must compensate for the force of the seam 180° opposite of the shearing force. Thus, the presence of shear seams provides much greater strength to the two layer article than with merely peel seams. Furthermore, such C-shaped materials providing shear seams upon inflation permits a simplified manufacturing procedure by placing such materials between two separate fabric layers and attaching each component simultaneously. Such an attachment may be performed through any well known method, such as sewing, gluing, and the like. However, most preferably, and in order to avoid the potential problems with yarn dislocation associated with stitching and the need then for greater amounts of undesirable expensive coating materials, the seams are formed through RF-welding techniques, such as those disclosed in U.S. patent application Ser. No. 09/326,368 to Keshavaraj et al. and U.S. patent application Ser. No. 09/406,000 to Keshavaraj. Such techniques involve the production of polymeric beads that adhere the fabrics together and also do not permit air to transfer through the weld itself. Such an efficient process thus translates into cost savings for the consumer. Additionally, such C-shaped materials, providing such strong seams, permit the omission of large amounts of coatings in order to seal the inflatable fabric for permeability reduction. Further methods of attaching these C-shaped materials include adhesives in film, gel, viscous liquid, or solid form.

The inflatable fabric itself is preferably produced from all-synthetic fibers, such as polyesters and polyamides, although natural fibers may also be utilized in certain circumstances. Preferably, the fabric is constructed of nylon-6,6. The individual yarns utilized within the fabric substrate must generally possess deniers within the range of from about 40 to about 840; preferably from about 100 to about 630. The C-shaped materials are preferably fabric in structure. More preferably they are woven and most preferably they are the same structure as utilized for the two layers of fabric themselves.

Coatings may be applied to the surface as a necessary supplement to the air permeability of the inventive fabric. Since one preferred ultimate use of this inventive fabric is as a side curtain airbag which must maintain a very low degree of air permeability throughout a collision event (such as a rollover where the curtain must protect passengers for an appreciable amount of time), a decrease in permitted air permeability is highly desirable. Any standard coating, such as a silicone, polyurethane, polyamide, polyester, rubber (such as neoprene, for example), and the like, may be utilized for this purpose and may be applied in any standard method and in any standard amount on the fabric surface.

Additional objects and advantages of the invention will be set forth in part in the description which follows, and in part will be obvious from the description, or may be learned by practice for the invention. It is to be understood that both the foregoing general description and the following detailed description of preferred embodiments are exemplary and explanatory only, and are not to be viewed as in any way restricting the scope of the invention as set forth in the claims.

BRIEF DESCRIPTION OF THE DRAWINGS

The accompanying drawings, which are incorporated in and constitute a part of this specification, illustrate several potentially preferred embodiments of the invention and together with the description serve to explain the principles of the invention wherein:

FIG. 1 is a side view of one preferred uninflated airbag including the inventive C-shaped pillow-forming materials.

FIG. 2 is a cross-sectional view of the uninflated airbag of FIG. 1 along line 4.

FIG. 3 is a cross-sectional view of the airbag of FIG. 2 while inflated.

FIG. 4 is an a side view of another preferred uninflated airbag including the inventive C-shaped pillow-forming materials orientated in slanted configurations.

DETAILED DESCRIPTION OF THE DRAWINGS

Turning now to the drawings, in FIG. 1 there is shown an unfolded, uninflated airbag 10 which may attach to the inside of a vehicle (not illustrated) at specific bolting points 12 and potentially by way of a supplemental tether system (not illustrated). This airbag 10 includes a first side of fabric 11 and a second side (21 in FIGS. 2 and 3) which are attached together by C-shaped materials along the periphery of the two fabrics 13, 15, 17, 18, 19 as well as throughout the mid-portion of the two fabrics 20, 22. Around the periphery materials 13, 15, 17, 18, 19 a sewn seam 16 (38 in FIG. 4) is also utilized to attach the fabrics together as well as to reinforcement the seal formed by such periphery materials 13, 15, 17, 18, 19. The periphery materials 13, 15, 17, 18, 19 and the mid-portion materials 20, 22 may be attached to the two fabric sides 11 (and 21 in FIGS. 2 and 3) by any standard means, including but not limited to polymeric beads formed by RF-welding, sewn threads, adhesives, and the like. Preferred are polymeric beads due to the strength provided by such a method to the C-shaped materials seams 13, 15, 17, 18, 19, 20, 22 as well as the omission of potentially problematic stitching at the fabric layers interface. The introduction of stitches increases the available area of leakage for gas to flow out of the bag. Upon inflation, such stitches would move in relation to the high pressures exerted throughout the bag structure and permit too much gas to escape to properly act as a side cushion in rollover situations. These mid-portion C-shaped materials 20, 22 thus act as attachment points between the two fabric layers 11 (and 21 of FIGS. 2 and 3) such that upon introduction of a gas into the bag through the inflator opening 14, the areas of the two-layer airbag 10 which are not attached via these C-shaped mid-portion materials 20, 22 will inflate and form "pillows" or intermittent cushions (not numbered) which provide passengers with a certain degree of protection from sudden movements as well as potentially broken windows.

FIG. 2 exemplifies the airbag 10 (the same uninflated airbag of FIG. 1) in cross-section view. Two layers of fabric 11, 21 are attached to C-shaped materials 17, 20, 22 simultaneously. A seam 16 acts as the sole attachment point for the illustrated portion of the airbag 10 at which the two fabrics 11, 21 are attached together without the benefit of any intermittent materials. In relation to the individual layers of fabric 11, 21, the C-shaped materials 17, 20, 22 are present in peel seam orientation in the uninflated state. Upon inflation, as depicted in FIG. 3, the C-shaped materials 17, 20, 22 stretch and, since they are simultaneously attached to both fabric layers 11, 21, are now more prevalently acting as shear seams. Furthermore, the pressures exerted upon each of the stretched C-shaped materials 17, 20, 22 are well balanced since the pressures exerted in one direction are countered with even pressures exerted from the opposite direction at the same time.

This utilization of C-shaped materials 17, 20, 22, particularly with RF-welding techniques to form the attachments between the materials 17, 20, 22 and the fabrics 11, 21, permits a considerable reduction in costly required labor as well. Such an airbag 10 may be formed by placing one fabric layer 21 on an apparatus including a weld head (not illustrated), placing the intermittent C-shaped materials 17, 20, 22 around and within the area of the first fabric layer 21 (with the proper polymeric bead-forming materials added thereto), and subsequently placing the second fabric layer 11 over the entire composite. Upon exposure to an electrical field, the weld head (not illustrated) then produces a polymeric bead attachment seam (not illustrated) at the desired locations within the final airbag structure 10. Again, a seam 16 may be added for reinforcement, etc., purposes; however, the entire bag may be formed in such a simple and straightforward manner without the need for labor-intensive and costly sewing procedures. The resultant airbag 10 should also be coated to a certain degree to provide the necessary long-duration low permeability upon inflation. However, with a reduction in possible areas of leakage, there is a correlative reduction in the need for large amounts of costly coatings.

Although FIG. 1 shows one preferred embodiment of this invention, one of ordinary skill in the art would easily understand that it is of extreme importance that airbag fabrics need to inflate uniformly over the entire structure in response to a collision event. Since only one single point of introduction of inflation gases usually exists within side curtain airbags, there exists a great difficulty in inflating the bag portion opposite the inflation port at the same rate as the area of the bag adjacent thereto. The preferred airbag 40 of FIG. 4 has been constructed to remedy this potential problem by introducing a barrier portion 39 which acts as a sort of "breakwater" to impede the progress of all of the gas introduced through the port 34 into the airbag 40. The gas must first travel around this barrier 39 before moving into the discrete areas of the airbag 40. In this manner the entire airbag 40 will inflate substantially uniformly (the same pressures throughout at the same approximate rate). The inventive airbag 40 is attached to the vehicle interior (not illustrated) by way of bolting points 36 and optionally a tether assembly (not illustrated). This airbag 40 forms "pillowed" structures analogous to those described and depicted within FIGS. 1–3 above. However, the C-shaped materials 30, 31, 32, 33 of this airbag 40 are slanted in relation to the fabric layers 37. This slanted orientation reduces the possibility of peeling of the seams formed by the C-shaped materials 30, 31, 32, 33 from the fabric layers 37 during inflation. Although these formed seams do act as shear seams predominantly during inflation and when simultaneously attached to both fabric layers 37, the chances of peeling from each individual fabric layer 37 is still possible. This slanted orientation thus aids in reducing such a possibility and also aids in the uniform inflation of the entire bag 40 noted above. The middle C-shaped material seams 31, 33 are arranged in the area between the front seat and the rear seat of the target vehicle to form a non-inflatable area within the bag 35. Since this area 35 does not need as much protection as the windows of the vehicle (not illustrated), there is a desire to prevent inflation in that area to increase the inflation rate for the remaining areas of the airbag 40.

In general, the C-shaped materials for each airbag depicted above are preferably rectangular in shape (prior to folding) and folded symmetrically prior to attachment to the target fabric layers. The length of such rectangular materials may be from about 1 inch to about 15 inches (2.54 cm to about 38.1 cm) and the width (prefolded) of such materials may be from about ½ inch to about 6 inches (1.27 cm to about 15.24 cm). Preferably, the length is from about 6 inches to about 12 inches (15.24 cm to about 30.5 cm); more preferably from about 6 to about 10 inches (25.4 cm). Preferably the prefolded width is from about ½ inch to about 4 inches (10.16 cm) (leaving each folded portion about ¼ inch to about 2 inches (from about 0.635 to about 5.08 cm) wide. The narrower the material, the stronger the provided shear seam upon inflation.

While specific embodiments of the invention have been illustrated and described, it is to be understood that the invention is not limited thereto, since modifications may certainly be made and other embodiments of the principals of this invention will no doubt occur to those skilled in the art. It is contemplated that the appended claims should cover any such modifications and other embodiments as incorporate the features of this invention which in the true spirit and scope of the claims hereto.

What I claim is:

1. An inflatable fabric comprising at least two layers of fabric in certain discrete areas of the fabric and at least on C-shaped material having a first and second end and a front and back side, interposed between said two layers of fabric and simultaneously attached to said two layers of fabric by welded polymeric beads, wherein said first end is attached to one layer and said second end is attached to the other layer.

2. The fabric of claim 1 wherein at least two C-shaped materials are present, interposed between said two layers of fabric, and simultaneously attached to said two layers of fabric.

3. The fabric of claim 2 wherein said at least two layers of fabric and said at least one C-shaped material are comprised of the same type of fabric.

4. The fabric of claim 2 wherein said at least two layers of fabric and said at least one C-shaped material are comprised of the same type of fabric.

5. The fabric of claim 1 wherein said at least two layers of fabric and said at least one C-shaped material are comprised of the same type of fabric.

6. The fabric of claim 5 wherein said at least two layers of fabric and said at least two C-shaped materials are comprised of the same type of fabric.

* * * * *